United States Patent [19]
Morris et al.

[11] 4,092,804
[45] June 6, 1978

[54] FLOWER POT AND INTERLOCKING SAUCER

[75] Inventors: Donald A. Morris; Eddie A. Wilson; Eric A. Little, all of Lawrence, South Korea

[73] Assignee: Packer Plastics, Inc., Lawrence, Kans.

[21] Appl. No.: 768,970

[22] Filed: Feb. 16, 1977

[51] Int. Cl.² .............................................. A01G 9/02
[52] U.S. Cl. ............................................. 47/66; 47/71
[58] Field of Search ................ 47/66, 67, 70, 71, 79, 47/80; 206/423

[56] References Cited
U.S. PATENT DOCUMENTS

| | | | |
|---|---|---|---|
| 2,504,031 | 4/1950 | Manning | 47/71 |
| 2,818,681 | 1/1958 | Coplen | 47/66 |
| 3,079,037 | 2/1963 | Schechter | 47/71 X |
| 3,183,624 | 5/1965 | Swett | 47/83 X |
| 3,943,661 | 3/1976 | Devito et al. | 47/67 |
| 3,949,524 | 4/1976 | Mickelson | 47/79 |
| 3,965,616 | 6/1976 | Ridgeway | 206/423 X |
| 3,981,099 | 9/1976 | Dziewuski | 47/67 |
| 3,990,179 | 11/1976 | Johnson et al. | 206/423 X |

Primary Examiner—Edgar S. Burr
Assistant Examiner—James R. Feyrer
Attorney, Agent, or Firm—Lowe, Kokjer, Kircher, Wharton & Bowman

[57] ABSTRACT

For a flower pot having a plurality of radially spaced holes in the bottom thereof, an interlocking saucer having a plurality of radially spaced fastener studs projecting from the bottom thereof. The fastener studs define a pot supporting plane located at least 0.1 inch (2.5mm) above the bottom of the saucer and include angled arms having a pot retaining side inclined at a greater angle than the opposite side of the arm. The fastener studs interlockingly fit with the corresponding holes of the flower pot to removably interconnect the saucer thereto.

6 Claims, 5 Drawing Figures

FLOWER POT AND INTERLOCKING SAUCER

BACKGROUND AND SUMMARY OF THE INVENTION

This invention relates to a flower pot with an interlocking saucer. More particularly, this invention relates to a saucer manufactured in a fixed mold and adapted to releasably interlock with a corresponding flower pot.

Those experienced in plant care recognize the desirability of providing flower pots, planters and the like with holes in the bottom thereof for appropriate drainage. It is likewise common to provide a saucer or dish under the plant container for either watering the plant roots from below by introducing water into the dish or for catching any drainage through the bottom holes when the water is introduced in the flower pot.

There are numerous commercially available pot and saucer configurations which are molded of plastic material and which snap together in an interlocking fashion to provide a unitary planter. Saucers of this genre characteristically include an undercut surface which is caused to interlock with a portion of the flower pot. Heretofore, the saucers must be molded in an elaborate mold having a sliding core or moving interior parts which act to form the undercut surface of the locking arrangement and which then are moved in order to release the formed saucer from the mold. Such a manufacturing technique has quite naturally resulted in increased cost for interlocking pots and saucers.

Accordingly, there is a need for a pot and saucer configuration with emphasis on economical considerations to provide an interlocking saucer moldable in a fixed or stationary type mold. The primary object of this invention is to fulfill this need.

More specifically, an object of the invention is to provide, for a flower pot or similar container, an interlocking saucer having undercut locking parts formed in a fixed mold. Thus is eliminated the necessity for a mold having a sliding core or moving interior parts to form the undercut locking surfaces of the saucer. As a consequence thereof, an extremely economical and reliable pot and saucer configuration is achieved which can be releasably interlocked in a snap together fasion.

Another object of the invention is to provide an interlocking saucer for a flower pot wherein the saucer includes outwardly inclined locking arms of a unique configuration which are adapted to snap within a plurality of corresponding holes in the bottom of the flower pot.

A further object of the invention is to provide an interlocking flower pot and saucer of the character described wherein the pot is elevatedly supported above the bottom of the saucer. This feature facilitates proper plant care by adequate irrigation and drainage through the holes of the pot.

Other and further objects of the invention, together with the features of novelty appurtenant thereto, will appear in the course of the following description of the drawing.

DESCRIPTION OF THE DRAWING

In the accompanying drawing, which forms a part of this specification and is to be read in conjunction therewith, and in which like reference numerals are employed to indicate like parts in the various views:

Referring to the drawing in greater detail, the flower pot or plant container is generally designated by the numeral 10 and includes a bottom 10a having a plurality of holes 10b therethrough. The holes 10b are arranged at equal angular intervals about the center of the bottom. Furthermore, the holes 10b are equidistant radially from the center of the bottom 10a such that an edge of each hole is substantially tangential to a given radius R. As shown in FIG. 2, for example, the outermost edge of each hole is tangential to radius R.

Figure 1:
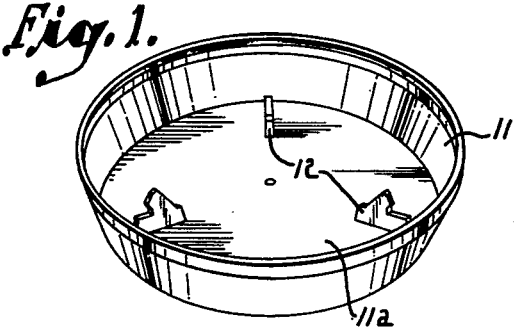
FIG. 1 is a perspective view of an interlocking saucer constructed in accordance with a preferred embodiment of the invention.
Figure 2:
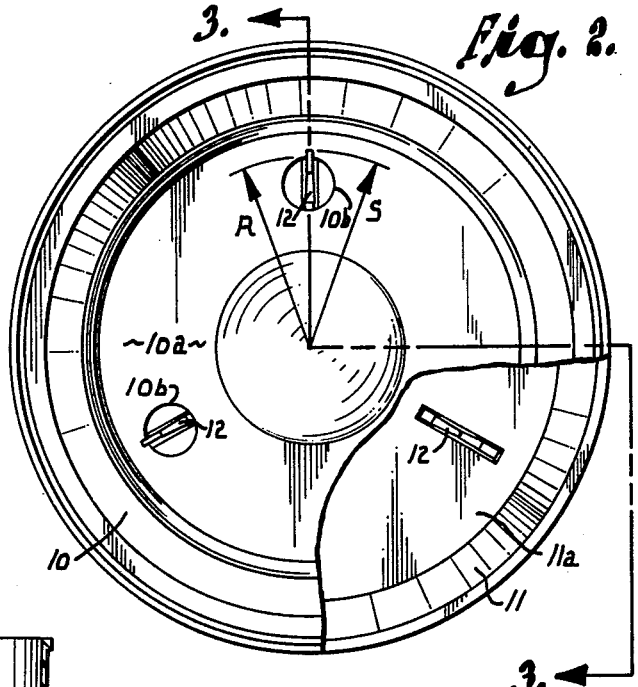
FIG. 2 is a top plan view of an interlockingly assembled flower pot and underlying saucer with a portion of the pot broken away to better illustrate the saucer details.
Figure 3:
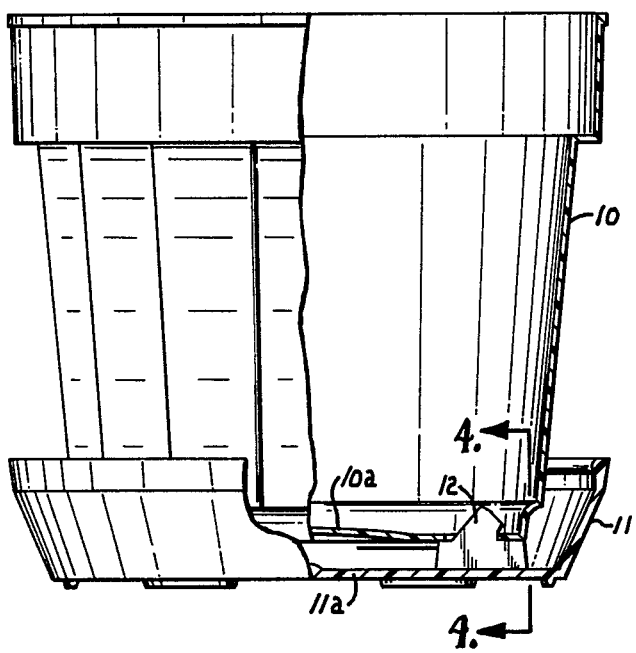
FIG. 3 is a side elevational view, partly sectional, taken generally along line 3—3 of FIG. 2 in the direction of the arrows.

As shown in the drawing, the dish or saucer is generally designated by the numeral 11 and is at least sufficiently large in size to receive therein the lower portion of the pot 10. The saucer 11 includes a bottom 11a to which are integrally molded a plurality of locking fasteners 12, each of which is equidistant from the center of the saucer bottom. The saucer illustrated in the drawing includes three such fasteners 12 arranged at equal angular intervals of 120°, but additional such fasteners may be included as desired.

Figure 4:
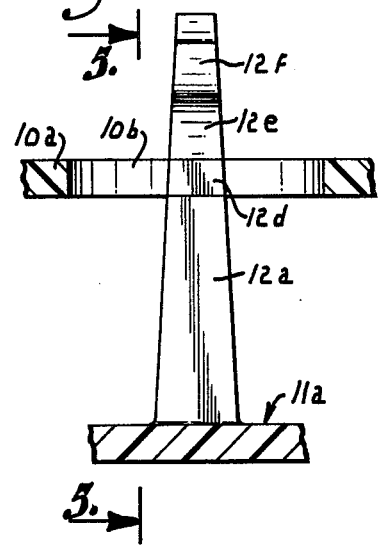
FIG. 4 is an enlarged edge view of an interlocking fastener taken generally along line 4—4 of FIG. 3 in the direction of the arrows.
Figure 5:
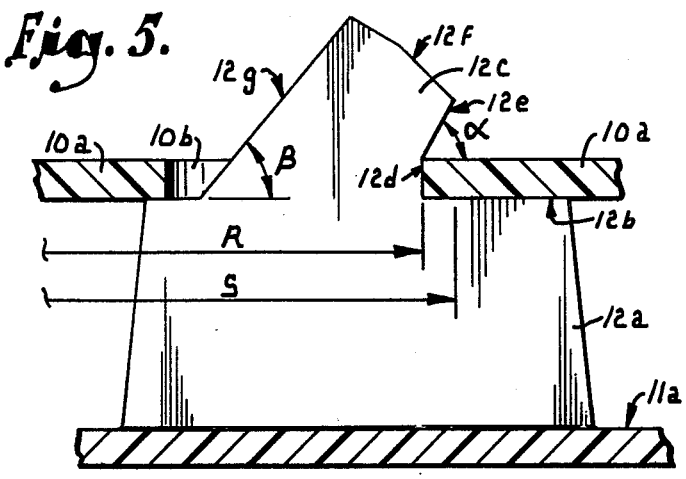
FIG. 5 is a side elevational view of the locking fastener taken along line 5—5 of FIG. 4 in the direction of the arrows.

With particular reference to FIGS. 4 and 5, each fastener 12 includes a pedestal 12a rising above the bottom 11a of the saucer and providing at the upper end thereof a pot supporting surface or ledge 12b which is at least 0.1 inch (2.5mm) above the bottom 11a of the saucer. Integrally joined to the top of the pedestal 12a is a tapered arm 12c which is inclined from the central longitudinal axis of the saucer 11. The arm 12c is so contoured as to provide, beginning at the inward edge of the pot supporting ledge 12b, a vertical pot abutting edge 12d which rises in length above the pot supporting ledge 12b a distance substantially equal to the thickness of the pot bottom 10a. At the top of the pot abutting edge 12d, the arm 12c has an inclined lower edge 12e extending to the end 12f and forming an incline angle α with the horizontal (FIG. 5). The end 12f tapers from a central apex. The upper edge 12g of the arm is inclined from the pedestal to the end 12f of the arm at an incline angle β with the horizontal (FIG. 5). For the purposes of this invention, it is important that the incline angle α of the lower edge 12e of the arm be larger than the incline angle β of the upper edge 12g of the arm. For example, angle α shown in the drawings is approximately 60°, while angle β is approximately 50°.

The fasteners 12 so described are disposed on the bottom of the saucer 11 such that the vertical, pot abutting surface 12d is positioned from the center of the saucer 11 a distance substantially equal to the given radius R. It should be noted at this point that the fasteners 12 may be oriented 180° from the position shown in the drawing to engage the innermost tangential edges of the holes 10b without departing from the scope of the invention. When the fasteners 12 are oriented as shown, however, the outermost portion of the arm 12c, represented as the junction of inclined lower edge 12e with the end 12f, therefore extends outwardly from the center of the saucer a distance of given radius S whereby radius S is greater than radius R. When the fasteners are oriented in the opposite direction, radius R will of course be greater than radius S. The absolute value of the difference between radius S and radius R thus represents the portion of the arm 12c retaining the pot 10 onto saucer 11 and, in order to magnitude, falls within the range of 0.01 inch (0.25mm) to 0.06 inch (1.52mm).

At this point it should then be apparent that the lower inclined surface 12e and the vertical pot abutting edge 12d form an undercut surface in the mold cavity used to manufacture the saucer 11. It would be expected that the molding of an undercut surface would require the use of a mold having a sliding core or movable interior parts. To the contrary, we have discovered that when the fasteners 12 are so configured within the limits as heretofore described, there will be sufficient flexure and clearance to permit the saucer 11 to be pulled away from the mold cavity.

To employ the snap together feature of the pot 10 and interlocking saucer 11, one need only align the fasteners 12 with the holes 10b in the bottom of the pot and then press the two parts together until the bottom 10a of the pot is received on the pot supporting plane defined by support ledges 12b of the fasteners 12. The end 12f is tapered to radius S to facilitate insertion of the fasteners 12 within the holes 10b. Since a portion of the arms 12c of the fasteners overhang the edge of the holes 10b by an amount of 0.01 inch (0.25mm) to 0.06 inch (1.52mm), the saucer 11 is firmly interlocked with the flower pot 10 such that the saucer 11 will be held thereon when the flower pot 10 is lifted. Alternatively, the pieces may be easily separated by grasping the saucer 11 and pulling the flower pot 10 away. The pieces may then be reassembled when desired.

From the foregoing, it will be seen that this invention is one well adapted to achieve all ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described our invention, we claim:

1. An interlocking molded saucer for a container having a bottom with a plurality of spaced holes, each said hole having an edge substantially tangential to a radius R, said saucer comprising:
   a saucer bottom portion;
   a continuous side wall integrally molded to said bottom portion around the perimeter thereof; and
   a plurality of fastener members integrally molded with said saucer bottom portion, each said member having a container abutting surface disposed from the center of said saucer bottom a distance substantially equal to said radius R and each said member further including an angled arm having an inclined outer end and further having a lower edge inclined from the horizontal at an angle α and an upper edge inclined from the horizontal at an angle β such that angle α is greater than angle β, said lower edge of said angled arm terminating at a point from the center of the saucer bottom equal to a radius S such that the absolute value of the difference between radius S and radius R falls in the range of 0.01 to 0.06 inches, whereby said saucer structure enables molding of said saucer by a fixed or stationary type mold;
   said fastener members being aligned with said holes of the container so that said container and saucer may be pressed together in releasably interlocking fashion with a portion of each said angled arm penetrating a corresponding hole in said container.

2. The interlocking saucer as in claim 1, each said fastener member including a container supporting surface adapted to supportingly engage the bottom of said container.

3. The interlocking saucer as in claim 2, said container supporting surface disposed above said saucer bottom a distance of at least 0.10 inches.

4. A planter construction comprising:
   a container having a bottom with a plurality of spaced holes, each said hole having an edge substantially tangential to a radius R;
   a molded saucer having a bottom underlying said container; and
   a plurality of fastener members integrally molded with said saucer bottom, each said member having a container abutting surface disposed from the center of said saucer bottom a distance substantially equal to said radius R and each said member further including an angled arm having an inclined outer end and further having a lower edge inclined from the horizontal at an angle α and an upper edge inclined from the horizontal at an angle β such that angle α is greater than angle β, said lower edge of said angled arm terminating at a point from the center of the saucer bottom equal to a radius S such that the absolute value of the difference between radius S and radius R falls in the range of 0.01 to 0.06 inches; whereby said saucer structure enables molding of said saucer in a fixed or stationary mold.

5. The planter as in claim 4, each said fastener member including a container supporting surface adapted to supportingly engage the bottom of the container.

6. The planter as in claim 5, said container supporting surface disposed above said suacer bottom a distance of at least 0.10 inches.

* * * * *

UNITED STATES PATENT AND TRADEMARK OFFICE
CERTIFICATE OF CORRECTION

PATENT NO. : 4,092,804
DATED : June 6, 1978
INVENTOR(S) : Donald A. Morris; Eddie A. Wilson; Eric A. Little It is certified that error appears in the above-identified patent and that said Letters Patent are hereby corrected as shown below:

Please correct the address of the inventors to read:

Lawrence, Kansas instead of Lawrence, South Korea

Signed and Sealed this

Twenty-first Day of November 1978

[SEAL]

Attest:

RUTH C. MASON
Attesting Officer

DONALD W. BANNER
Commissioner of Patents and Trademarks